United States Patent [19]
Fujimoto et al.

[11] 4,365,023
[45] Dec. 21, 1982

[54] METHOD FOR MANUFACTURING BLOCK COPOLYMER

[75] Inventors: Teruo Fujimoto; Mitsuru Nagasawa, both of Nagoya; Syotaro Ohno, Tokuyama, all of Japan

[73] Assignee: Toyo Soda Manufacturing Co., Ltd., Shinnanyo, Japan

[21] Appl. No.: 206,562

[22] Filed: Nov. 13, 1980

[30] Foreign Application Priority Data

Nov. 27, 1979 [JP] Japan ................................ 54/152386

[51] Int. Cl.³ ............................................. B01J 43/00
[52] U.S. Cl. ......................................... 521/32; 521/38
[58] Field of Search ............... 521/38, 30, 32; 525/95

[56] References Cited
U.S. PATENT DOCUMENTS

| | | | |
|---|---|---|---|
| 3,657,201 | 4/1972 | Tokeya et al. | 521/38 |
| 3,770,712 | 11/1973 | Schwab | 54/30 |
| 4,107,121 | 8/1978 | Stoy | 260/29.6 HN |

Primary Examiner—William F. Hamrock
Assistant Examiner—Peter F. Kulkosky
Attorney, Agent, or Firm—Armstrong, Nikaido, Marmelstein & Kubovcik

[57] ABSTRACT

A ternary block copolymer and a method for manufacturing it. The copolymer has a molecular structure consisting of a macro-molecule having a cation exchange group, a macro-molecule having an anion exchange group and another macro-molecule which does not have any ion exchange group. These macro-molecules are linked together into a straight chain.

7 Claims, 3 Drawing Figures

METHOD FOR MANUFACTURING BLOCK COPOLYMER

BACKGROUND OF THE INVENTION

This invention relates to a ternary block copolymer in which poly A, poly B and poly C which are the polymers of monomers A, B and C are linked into a molecular chain in such a manner as "poly A-poly B-poly C" or "poly A-poly B-poly C-poly B-poly A" to have the poly A, the poly B and the poly C included in the molecular chain.

Heretofore, in efforts to improve physical properties of high polymer materials, blending of macromolecules of different kinds and random copolymerization, graft copolymerization and block copolymerization of monomers of different kinds have been attempted. It has been known that block copolymers of an unique micro-phase separated structure have novel properties because of their heterogeneous micro-structure. For example, ABA type block copolymers consisting of styrene and butadiene have already been marketed as thermoplastic rubber.

When a molecular chain formed with macromolecules of different kinds are joined together, the component macro-molecular segments of different kinds do not intermix with each other. Meanwhile, since they are within the same molecular chain, they are restrained from phasic parting in distance and shape and thus form a structure having separated micro phases which are close to the size of a molecule. In the case of the commercially available ABA type block copolymers (A representing polystyrene and B polybutadiene) which are mentioned in the foregoing, it is well known that a block copolymer which includes 5% by weight or thereabout of styrene has polystyrene portion thereof from a spherical micro-domain measuring several hundred angstroms in diameter while the polybutadiene portion is in a continuous phase filling up a space between the spherical domains of polystyrene.

SUMMARY OF THE INVENTION

The inventors of the present invention have discovered that a ternary block copolymers can be prepared also to have the regularly micro-phase separated structure that is peculiar to a binary block copolymer. This discovery has promised a broader range of applications of block copolymers and the provision of block copolymers usable as materials meeting new functional requirements.

It is known that blending a macro-molecule having a cation exchange group and a macro-molecule having an anion exchange group usually causes both the ion exchange groups to form salts to give a neutral complex generally known by the name of a high polymer salt or a poly-ion complex. The same reaction also takes place in a random copolymer containing a cation exchange group and an anion exchange group. In this instance, in addition to the salt formation between molecules, there takes place a similar reaction also within each molecule and the copolymer does not function as ion-exchange body. Therefore, in order to allow a cation exchange group and an anion exchange group to coexist with each other in a high polymer material, the two exchange groups must be separated from each other to prevent a reaction between them. A feature of the present invention lies in such arrangement. In other words, while the two ion exchange groups are allowed to coexist within a molecular chain, the two ion exchange groups are separated thereby utilizing the micro phase separation that takes place in a block copolymer. By this arrangement, formation of a poly-ion complex is prevented to permit concomitance of a cation exchange group and an anion exchange group within the same material.

It is thus a general object of the invention to provide a ternary block copolymer which comprises three component segments including one segment having a cation exchange group, another having an anion exchange group and the last one having no ion exchange group.

As a result of forming a micro-phase separation structure in a solid state, this ternary block copolymer forms three domains including a domain which has a cation exchange group, another domain which has an anion exchange group and the last domain which is neutral.

In forming these domains, presence of a minor amount of component segments of independent polymers or an incomplete block copolymer within the block copolymer gives no hindrance. For example, in obtaining a ternary copolymer of a poly A-poly B-poly C-poly B-poly C type through a living anion polymerization process, there are also produced a poly C, a poly B-poly C, a poly B-poly C-poly B, a poly A-poly B-poly A, and a poly A-poly B-poly C-poly B because of the influence of impurities during the polymerization process. However, the formation of the micro-phase separation structure of the ternary copolymer is unaffected by these products. Further, in the case of the example mentioned above, mixing a small amount of the poly A, the poly B and poly C with the ternary copolymer gives almost no adverse effect on the size of the micro-phase separation structure of the copolymer.

Of the three kinds of the domains, the component segment which forms the domain having the cation exchange group must have a carboxyl group or a sulfonic acid group or a phosphoric acid group or the like in the molecular chain there. In order to introduce these cation exchange groups into the segment, the segment should be a polymer of unsaturated carboxylic acid ester which produces a carboxyl group through hydrolysis, (such as acrylic acid ester, methacrylic acid ester, crotonic acid ester, or conjugated diene system carboxylic acid ester), or a polymer of a monomer having a cyano group of acrylo nitrile, methacrylo nitrile, vinylidene cyanide, etc., or a polymer of methylene malonic acid ester, α-cyano acrylic acid ester, etc., or a polymer of styrene or α-methyl styrene which can be readily sulfonated by a known method. The segment which forms the domain having an anion exchange group must have a functional group such as an ammonium group, sulfonium group or a phosphonium group. Such a functional group can be obtained by making a polymer of a styrene derived amine quaternary. Such a styrene derived amine is selected, for example, out of the group consisting of a vinyl pyridine which has the nitrogen atom forms a part of a heterocyclic compound and has a vinyl group (such as 2-vinyl pyridine, 4-vinyl pyridine, 2-methyl-5-vinyl pyridine, etc.), a vinyl pyrimidine, a vinyl quinoline, a vinyl carbazole, vinyl imidazole, and o-, m- and p-vinyl benzyl-alkyl amines expressed by the following formula:

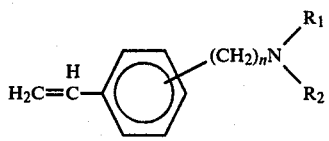

(wherein n=1—3; and $R_1$ and $R_2$ represent alkyl groups of carbon number 1–12.)

Further, a polymer of an alkylamino acrylate expressed by:

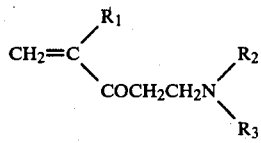

(wherein $R_1$: alkyl group of carbon number 1–12.

$R_2$ and $R_3$: alkyl groups of carbon number 1–12) or a polymer of dialkyl acrylic amide expressed by:

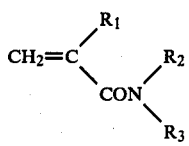

(wherein $R_1$: alkyl group of carbon number 1–12

$R_2$ and $R_3$: alkyl groups of carbon number 1–12) may be processed to make it quaternary to permit introduction of the cation exchange group into the segment.

As for the segment which does not have any ion exchange group, this segment is arranged to give strength to the whole copolymer. It is therefore preferable that this segment is, for example, a polymer of butadiene or isoprene. Since this neutral domain belongs to a diene system, crosslinking can be readily effected by sulfur or concentrated sulfuric acid through a known process. This is one of the features of the present invention.

The final composition of the block copolymer is required to be such that the percentage by weight of the segment which is included in the copolymer to form the neutral domain is within the range of 30 to 90%, because: Generally, in the case of a ternary block copolymer having less than 30% by weight of a neutral diene system polymer as component thereof, a crosslinking process applied to this component for the purpose of increasing the strength of the copolymer would not give a satisfactory degree of strength to the copolymer. On the other hand, when this component segment exceeds 90%, the features of a ternary block copolymer diminishes and the effects of the cation and anion exchange groups lessen.

It is mandatory that the percentage by weight of the component segment having the cation exchange group and that of the component segment having the anion exchange group are at least 5% respectively. Where the ternary block copolymer is to be used, for example, as membrane for piezo-dialysis, the salt concentrating effect lowers to a great extent when one of the components is less than 5%.

The ternary block copolymer described in the foregoing is obtained by shaping a crude ternary block copolymer which has been prepared through an ordinary known living anion polymerization process into a desired form and then by subjecting it to a hydrolyzing process, a sulfonation process and a process for making it quaternary. If necessary, the poly-diene system segment which forms the neutral domain can be crosslinked. An example of procedures for obtaining the ternary block copolymer is as described below:

Using butyl lithium (n, sec, tert, etc.) or 2-methylbutyl lithium which is known as living anion polymerization initiator, or sodium naphthalene, sodium anthracene, sodium α-methylstyrene tetramer, sodium biphenyl, or the like, polymerization is carried out in an aromatic hydrocarbon, cyclic ether or aliphatic hydrocarbon (generally selected out of a group consisting of benzene, toluene, tetrahydrofuran, n-hexane, cyclohexane, etc.) under vacuum or an inert gas atmosphere such as nitrogen gas, argon gas, etc. to obtain a crude ternary block copolymer.

This crude ternary block copolymer is shaped into a desired form such as powder or film. The crude ternary block copolymer is then processed either to make its nitrogen portion quaternary or to make it into a tertiary ammonium salt. Following that, the aromatic ring of the copolymer is sulfonated and the carboxylic acid ester thereof is hydrolyzed. The nitrogen is changed to be quaternary by a known method, i.e. by allowing it to react with an alkyl halide. The swelling condition of the component segment which contains quaternary amine changes with the change of the carbon number of a quaternary reagent and it is possible to control the water content of the whole membrane by utilizing this. Further, it is also possible to make the nitrogen portion into a tertiary ammonium by hydrochloric acid or the like.

The sulfonation of the aromatic ring can be carried out by a known process with concentrated sulfuric acid. The hydrolysis of the carboxylic acid ester also can be carried out by a known process with an aqueous solution of sodium hydroxide or the like.

Visual observation of the micro-phase separation structure of the final ternary block copolymer product is difficult even with an electronic microscope. The micro-phase separation structure, therefore, has to be inferred from the condition of the crude ternary block copolymer observed prior to the introduction of the exchange groups. The micro-phase separation structure of the crude ternary block copolymer can be visually observed with a transmission type electronic microscope by dyeing the diene system component with osmium tetroxide and the amine portion with tungstophosphoric acid in accordance with a known method.

The ternary block copolymer obtained in accordance with the invention is usable, for example, as amphoteric ion-exchange resin or piezo-dialysis membrane and is applicable to a wide range of purposes, such as separation or refining of biological matters, removal of toxic matters from industrial waste water, etc.

The above and further objects, features and advantages of the invention will be apparent from the following detailed description of preferred embodiment examples taken in connection with the accompanying drawings.

DETAILED DESCRIPTION OF PREFERRED EMBODIMENTS

The following embodiment examples are intended to illustrate the invention and are not to be construed to limit the scope of the invention:

EXAMPLE 1

Polymerization was carried out in benzene, which had been refined through a sodium mirror, with sec-butyl lithium used as initiator and sequentially adding styrene, p-vinylbenzyl dimethyl amine and isoprene. The conditions under which the polymerization was carried out were as shown below:

|  | Polymerizing temperature (°C.) | Polymerization time (hr.) | Concentration (mol/l) |
| --- | --- | --- | --- |
| sec-butyl lithium | — | — | $4.3 \times 10^{-4}$ |
| Styrene | 35 | 6 | $3.1 \times 10^{-1}$ |
| p-vinyl-benzyl dimethyl amine | 15 | 12 | $1.8 \times 10^{-1}$ |
| Isoprene | 25 | 20 | $4.4 \times 10^{-1}$ |

Figure 1:
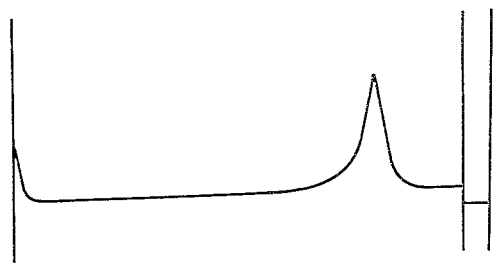
FIG. 1 is an illustration showing the ultra-centrifugal sedimentation pattern of a block copolymer consisting of styrene, p-vinyl-benzyl dimethyl amine and isoprene.

The polymerization yield of each monomer was 100%. The molecular weight distribution of the ABC type block copolymer was relatively narrow as apparent also from the ultra-centrifugal sedimentation pattern shown in FIG. 1. This clearly indicates that the polymerization proceeded without any side reaction.

Figure 2:
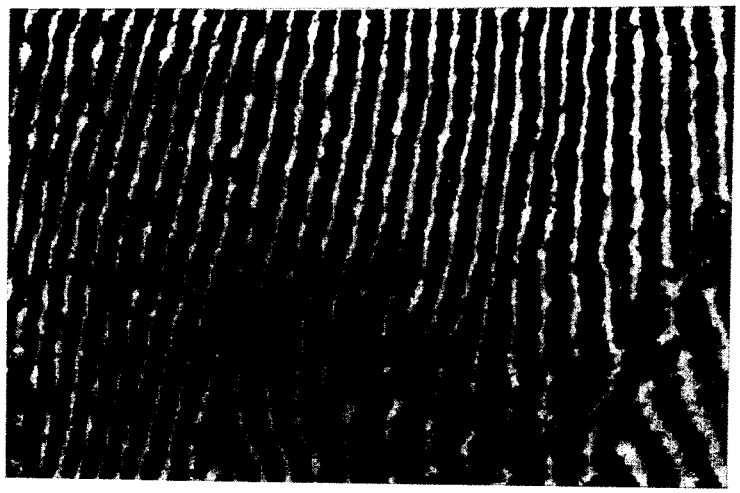
FIG. 2 is a photograph obtained from a transmission type electronic microscope in carrying out observation of the same block copolymer with the polyisoprene portion thereof dyed with osmium tetroxide.
Figure 3:
FIG. 3 is a photograph obtained also from the transmission type electronic microscope in observing the same block copolymer with the poly-p-vinyl-benzyl dimethyl amine portion thereof dyed with tangsto-phosphoric acid.

A film which was obtained from a benzene solution of the crude ternary block copolymer was immersed in an aqueous solution of osmium tetroxide to have the polyisoprene portion thereof dyed with the osmium tetroxide. FIG. 2 is a photograph of the dyed film obtained from a transmission type electronic microscope. Another film which was obtained in the same manner was immersed in tungstophosphoric acid to have the poly-p-vinyl-benzyl dimethyl amine portion thereof dyed with the tungsto-phosphoric acid. A photograph of this is as shown in FIG. 3. In each of these photographs, black parts indicate dyed parts, which clearly show that the ternary block copolymer has a micro-phase separation structure formed therein.

After the crude ternary block copolymer is formed into a film, the film was immersed in 1 normal ethylene bromide over a period of 24 hours to make the poly-p-vinyl benzyl dimethyl amine portion thereof quaternary. Following that, the film was immersed in 90% concentrated sulfuric acid over a period of 24 hours to have the polystyrene portion thereof sulfonated. The film was then subjected to an elementary analysis. The results of the elementary analysis indicated that S was 3.0% and Br 5.6%.

EXAMPLE 2

Polymerization was carried out in tetrahydrofuran at −78° C. with n-butyl lithium used as initiator sequentially adding isoprene, 2-vinyl pyridine and t-butyl acrylate. The ratio by weight was 7:1.5:1.5. A block copolymer thus obtained was subjected to measurement by gel permeation chromatography. The results of the measurement indicated that the molecular weight distribution in the block copolymer was relatively wide and suggested that there were produced an incomplete block copolymer and a homo-polymer of polyisoprene.

The crude ternary block copolymer which was obtained as mentioned in the foregoing was shaped into the form of a film measuring about 50 μm in thickness. A piece of this film was immersed in osmium tetroxide to have the polyisoprene and poly-2-vinyl pyridine portions dyed with the osmium tetroxide. The dyed film piece was subjected to visual observation by a transmission type microscope. Through the results of this observation, it was ascertained that the t-butyl poly-acrylate which was represented by parts not dyed formed a spherical domain measuring about 200 Å in diameter.

The film of the crude block copolymer was immersed in 70% sulfuric acid over a period of 24 hours to crosslink the polyisoprene portion thereof. Then, the film was boiled in an aqueous solution of 5% sodium hydroxide for a period of two hours to have the t-butyl polyacrylate portion thereof hydrolyzed. After that, the film was thoroughly washed with water and dried. Next, the film was immersed in ethylene chloride for a period of five hours to make the poly-2-vinyl pyridine portion thereof quaternary. Through these processes, a film of a ternary block copolymer having cation and anion exchange groups separated from each other was obtained.

The film thus obtained was put in 1 normal hydrochloric acid and left intact there over a period of 24 hours. After that, the film was thoroughly washed with water and dried. Elementary analysis was carried out to determine N and Cl contained in the film. The results of the determination indicated that N was 1.4% and Cl 3.4% and thus equimolecular presence of them was ascertained. Therefore, in the film, quaternary amine and carboxylic acid did not form any complex.

COMPARISON EXAMPLE 1

Mono-polymers of polyisoprene, poly-2-vinyl pyridine and t-butyl polyacrylate were obtained by the living anion polymerization process. The mono-polymers were dissolved in tetrahydrofuran and were solution blended in the ratio by weight of 7:1.5:1.5. The film which was obtained from this solution was whitely opaque. According to the results of visual observation by an electronic microscope which was carried out through the same dyeing process as the observation mentioned in the foregoing, the diameter of the domain of the t-butyl polyacrylate was more than several μm and was quite uneven with larger ones measuring close to 1 mm, although the continuous phase was formed by poly-isoprene.

What is claimed is:

1. A method for manufacturing by living anion polymerization a ternary copolymer of a molecular structure formed with a macro-molecule which has a cation exchange group, a macro-molecule which has an anion exchange group and another macro-molecule which does not have any ion exchange group therein linked together into a straight chain, said method comprising: obtaining a crude ternary block copolymer by carrying out block copolymerization of a monomer component which is capable of forming a macro-molecular domain permitting introduction of a cation exchange group thereinto, a monomer component which is capable of forming a macro-molecular domain permitting introduction of an anion exchange group thereinto and a monomer component which is capable of forming another macro-molecular domain which contains no ion exchange group; a process of shaping said crude ternary block copolymer into a desired form; introducing a cation exchange group into said macro-molecular domain which permits introduction of a cation exchange group thereinto; and introducing an anion exchange group into said macro-molecular domain which permits introduction of an anion exchange group thereinto; wherein the percentage by weight of the monomer component which is capable of forming said macro-molecular domain having no ion exchange group is 30–90%, and the percentage by weight of the monomer which is capable of forming said macro-molecular domain permitting introduction of a cation exchange group and that of the monomer component which is capable of forming said macro-molecular domain permitting introduction of an anion group are at least 5% respectively.

2. A method for manufacturing a ternary copolymer according to claim 1 wherein said macro-molecular domain having no ion exchange group is subjected to a crosslinking process after said crude ternary block copolymer is shaped into a desired form.

3. A ternary block copolymer having a molecular structure in which a macro-molecule which has a cation exchange group, a macro-molecule which has an anion exchange group and another macro-molecule which does not have any ion exchange group are linked together into a straight chain; wherein the percentage by weight of said macro-molecule which does not have any ion exchange group is 30–90%, and the percentage of said macro-molecule which has a cation exchange group and said macro-molecule which has an anion exchange group are at least 5% respectively.

4. A ternary block copolymer according to claim 3 wherein said component macro-molecule containing a cation exchange group is a portion consisting of an unsaturated carboxylic acid ester polymer or a hydrolysate thereof, or a portion consisting of an aromatic vinyl compound polymer or a sulfonated product thereof.

5. A ternary block copolymer according to claim 3 or 4 wherein said component macro-molecule containing an anion exchange group is a nitrogen-containing heterocyclic compound or a polymer of a monomer expressed by the following structural formula or a matter completely made quaternary:

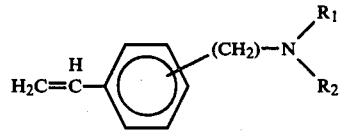

wherein n: 1–3

$R_1$ and $R_2$: alkyl groups of carbon number 1–12.

6. A ternary block copolymer according to claim 5, wherein said component macro-molecule having no ion exchange group is of a polydiene.

7. A ternary block copolymer according to claim 1 wherein said polydiene component macro-molecule is crosslinked.

* * * * *